United States Patent [19]

Reneau

[11] 4,330,143
[45] May 18, 1982

[54] APPARATUS FOR CONNECTING TOGETHER FLOWLINE END PORTIONS

[76] Inventor: Bobby J. Reneau, P.O. Box 11625, Houston, Tex. 77016

[21] Appl. No.: 99,756

[22] Filed: Dec. 3, 1979

[51] Int. Cl.$^3$ ............................................. F16L 21/06
[52] U.S. Cl. .................................. 285/322; 285/343; 285/348; 285/347; 285/351; 285/15
[58] Field of Search ..................... 285/322, 323, 332.2, 285/18, 343, 351, 15, 368, 348, 412, 347, 414, 34, 243, 382; 24/208 R; 279/41 R, 46 R

[56] References Cited

U.S. PATENT DOCUMENTS

| | | | |
|---|---|---|---|
| 3,489,437 | 1/1970 | Duret | 285/332.2 X |
| 3,610,666 | 10/1971 | Tyler | 285/351 X |
| 3,986,728 | 10/1976 | Marsh | 285/322 X |
| 4,109,945 | 8/1978 | Manchester | 285/323 |
| 4,138,147 | 2/1979 | Manchester | 285/323 |

Primary Examiner—Dave W. Arola

[57] ABSTRACT

An apparatus for connecting first and second flowline members for fluid flow therethrough and a method of utilizing same for effectuating such a repair, with the apparatus including a first housing member adapted to be mounted with the first flowline member and having a seal ring mounted therein for sealably engaging the butt end of a second flowline member for effecting a fluid-tight relation therebetween, a second housing member mounted for axial movement with respect to the first housing member and gripping means with the second housing member for moving radially inwardly into gripping engagement with the second flowline member upon axial movement of the second housing member toward the first housing member. In accomplishing the method of the present invention, a cutting of the flowline to remove the damaged portion must be effectuated and thereafter securing a first housing member of the apparatus to the replacement portion of the flowline, thereafter positioning the connector apparatus over the undamaged portion of the flowline such that the seal ring of the connector apparatus is in an abutting relation with the butt end surface of the undamaged portion of the flowline and thereafter moving the first and second housing members axially toward one another to effect an abutting, sealable relation between the butt end surface of the undamaged portion of the flowline and the seal ring and to grip the undamaged portion of the flowline with gripping means with the second housing member.

7 Claims, 3 Drawing Figures

APPARATUS FOR CONNECTING TOGETHER FLOWLINE END PORTIONS

TECHNICAL FIELD

The field of this invention relates to the connection together of first and second flowline members for fluid flow therethrough after a damaged portion thereof has been removed and in particular, to the reestablishment of a connection between the severed portions of an underwater pipeline.

PRIOR ART

Typically, in making repairs for an underwater pipeline, it is necessary to remove a damaged section and replace that section with a new, undamaged pipeline section. Such a replacement requires underwater welding, which is extremely time-consuming and a technically difficult task. Various coupling devices have been developed to eliminate the need for such underwater welding procedures.

Of such devices, numerous types are hydraulically actuated such as those shown in U.S. Pat. Nos. 3,393,926; 3,704,033; 3,707,025 and 3,830,526. However, some such couplers are not based upon hydraulic actuation but a mechanical action between the component parts thereof. For example, U.S. Pat. Nos. 4,109,945 and 4,138,147 to the instant inventors are indicative of several types of coupling devices incorporating mechanical actuation for joining pipe sections by means of gripping and sealing pipeline sections theretogether. Other examples of mechanical type connectors include those found in U.S. Pat. Nos. 1,479,650; 1,604,580; 1,654,463; 2,459,956; 2,832,615; 2,850,301; 3,097,866; 3,977,702; 3,997,199; 4,000,921; and 4,006,921. However, so far as is known, all such connectors depend upon sealing being effectuated between the connector attached to one flowline member and the second flowline member by means of primary sealing engaging the outer annular surface of a specially machined pipeline section on an undamaged portion of the flowline member. Such sealing is typically formed by means of elastomeric type seals that move radially inwardly in response to axial movement of various portions of the connector apparatus. So far as is known, no attempts have been made to utilize and effectuate a metal-to-metal seal adjacent the butt end surface of the flowline connector for establishing a sealable relation between the connector and the undamaged portion of the flowline member.

SUMMARY OF THE INVENTION

It is an object of this invention to provide a new and improved apparatus for connecting first and second flowline members for fluid flow therethrough in an effort for using same while providing a new and useful mechanically less complex apparatus for connecting together such flowline end portions.

These objects and other objects of this invention set out in greater detail in the description to follow should not be interpreted as being anything more than a mere summary of the objects of this invention. These objects and other objects of this invention are carried out by the apparatus of the preferred embodiment of this invention for connecting together such first and second flowline members for fluid flow therethrough. The apparatus of the present invention includes a housing adapted to have a seal ring mounted therein with the seal ring for sealably engaging the butt end surface of the second flowline member for effectuating a fluid-tight relation therebetween. A second housing member is mounted for axial movement with respect to the first housing member for causing gripping means therewith to move radially inwardly into gripping engagement with the second flowline member to insure positive mechanical sealing and engagement therebetween the apparatus and the second flowline member.

DESCRIPTION OF THE PREFERRED EMBODIMENT

Figure 1:
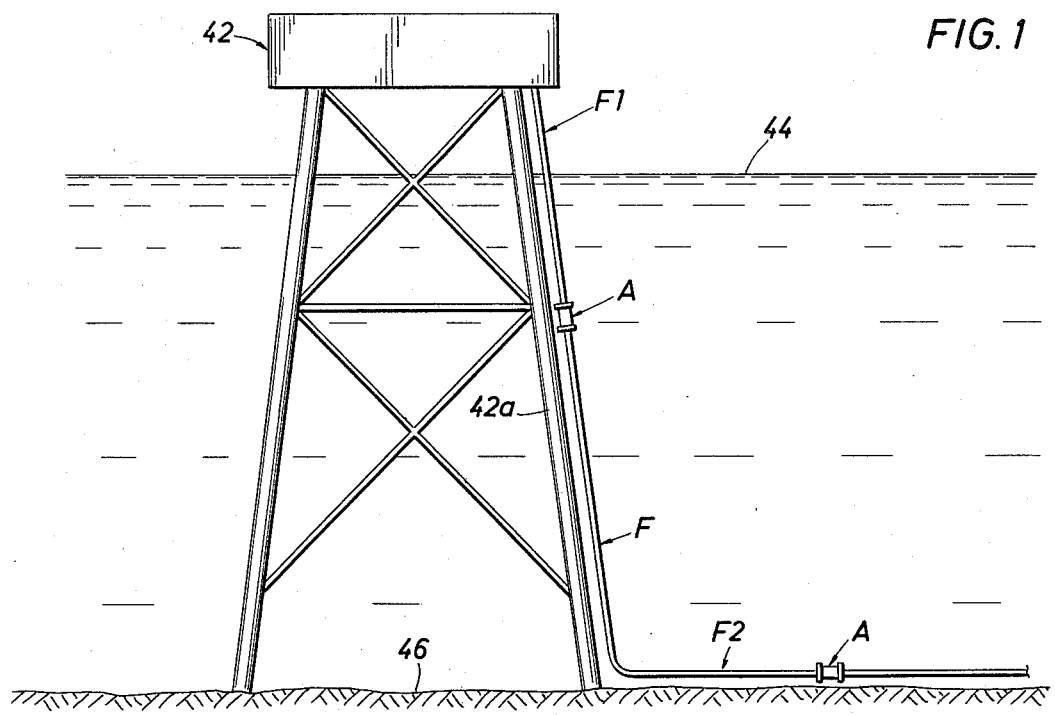
FIG. 1 is a schematic, elevational view of a platform showing a flowline having the apparatus of the present invention as affixed to the flowline at various positions.

Referring to the drawings, the letter F designates generally a flowline or a pipeline which is located under water. Such a flowline F for any number of reasons may have a damaged area D that must be removed, requiring replacement of such a damaged area. Accordingly, the flowline F must be severed into a first flowline member F1 and a second flowline member F2, which must thereafter be reconnected together for fluid flow therethrough for transferring fluids, such as oil gas, and the like through the pipeline F. The apparatus A of the present invention is adapted to be connected to the flowline F to reconnect the fluid flow through the first flowline member F1 that has been severed from the second flowline member F2. Unless otherwise specified, it is preferred that the components of the apparatus A of the present invention preferably be formed of steel or other suitable high-strength materials capable of taking heavy stresses and strains typically encountered by such apparatus A when operating in its intended conditions and environment.

The apparatus A of the present invention includes a first housing member designated generally as H1 adapted to be affixed to the first flowline F1 and receive a portion of the flowline F2 therein. A second housing member designated generally as H2 is mounted for axial movement with respect to the first housing member H1. The housing member H1 includes housing 10 which is a hollow, cylindrical member having a first bore 10a and a second bore 10b formed therein. The first bore 10a preferably is of an inside diameter substantially the same as the inside diameter of the flowline member F. The second bore 10b is preferably of an inside diameter slightly larger than the outside diameter of the outer surface 14 of the flowline member F. A radial lip 10c is formed adjacent the first and second bores 10a, 10b of the housing 10. A radial end surface 10d is formed adjacent the second bore 10b with an outer annular surface 10e formed adjacent thereto. A radial flange surface 10f is formed adjacent annular surface 10e with annular flange surface 10g formed adjacent thereto. Outer annular surface 10h is formed adjacent annular flange surface 10g, with the annular surface 10h preferably being of a tapered configuration for the reasons set forth hereinbelow. End surface 10i is formed between outer annular surface 10h and first bore 10a. An opening 10j is preferably formed extending between the outer annular surface 10e and the second bore 10b as discussed more fully hereinbelow.

The second housing H2 includes housing 16 which is mounted for axial movement with respect to the first housing 10. The second housing 16 includes an internal bore 16a formed therein and adapted to receive the outer annular surface 10e of housing 10 therein for relative axial movement between the housing members H1, H2. A radial lip 16b is formed adjacent internal bore 16a with a plurality of collet camming surfaces formed adjacent the radial lip 16b. A collet camming surface 16c is formed in an annular, spiralling conic surface configuration. Thrust ring detent 16d is formed adjacent collet camming surface 16c with end surface 16e formed adjacent thereto. Outer annular surface 16f extends between end surface 16e and end surface 16g.

The apparatus A of the present invention further includes seal ring S for sealably engaging the flowline member F. Preferably the seal ring 18 is formed of a steel or other metal that may be either softer or harder as compared with the flowline member F, as desired. The seal ring S includes seal ring 18 mounted in the first housing member H1 adjacent radial lip 10c such that surface 18a of the seal ring 18 abuts radial lip 10c. The outer annular surface 18b of seal ring 18 is adapted to be disposed within second bore 10b of housing 10 with the bore 18c of the seal ring 18 approximating the first bore 10a of housing 10 and inside diameter 12 of flowline member F. The seal ring 18 further includes a surface 18d which extends between the bore 18c and outer annular surface 18b. The surface 18d, preferably beveled, is adapted to engage a similarly formed butt end surface 20 of the second flowline member F2, as discussed more fully hereinbelow. It will be appreciated that the surface 18d and butt end surface 20 may be beveled, V-shaped, radial, grooved or any other suitable configuration as is necessary, or desired.

The apparatus A of the present invention further includes gripping means designated generally as G with the second housing member H2 for moving radially inwardly into gripping engagement with the second flowline member F1 upon axial movement of the second housing member H2 towards the first housing member H1. The gripping means G includes a collet member 22 having an annular, spiralling collet camming surface 22a formed on the outer surface thereof and a plurality of gripping surfaces 22b formed on the inner surface thereof, with end surfaces 22c, 22d formed adjacent each end thereof. The gripping means G of the present invention further includes the housing camming surface 16c which cooperates with collet camming surface 22a. Preferably the collet member 22 is formed having a plurality of slots such as slot 22e that extends from end surface 22d towards end surface 22c to slot end 22f. Other slots (not shown) extend from end surface 22c towards end surface 22d. The slots 22e permit the collet member 22 to flex radially inwardly and outwardly in response to action of the collet camming surface 22a of the collet member 22 in engagement with the housing camming surface 16c of housing 16, upon axial movement of the housing H2 with respect to the housing H1.

The apparatus A of the present invention further includes sealing means designated generally as 24. Preferably, the sealing means includes a seal member 24a for sealing the first and second housing members H1, H2 with the second flowline member F2 upon axial movement of the second housing member H2 towards the first housing member H1. Preferably, the sealing means 24 includes a seal member 24a which is mountable in the internal bore 16a of housing 16 between the gripping means G and the first housing member H1. Preferably, the seal member 24a is of a suitable elastomeric material and is adapted to be mounted adjacent annular end surface 10d of housing member H1 and thrust ring 26. Alternatively, the seal means 24 may be a suitable spring (not shown) as discussed more fully hereinbelow. The thrust ring 26 is adapted to engage end surface 22d of collet member 22 and the sealing means 24 to confine the seal means 24 therebetween the thrust ring 26 and end surface 10d of housing 10. Axial movement of the second housing member H2 towards the first housing member H1 results in the end surface 22d of the collet member 22 acting upon the thrust ring 26 to compress the sealing means 24 between the thrust ring 26 and end surface 10d. Thus, surface 26a of thrust ring 26 engages end surface 22d of collet member 22 and surface 26b of thrust ring 26 engages the seal member 24a of the sealing means 24. Compression of the sealing means 24 between the thrust ring 26 and end surface 10d causes deformation of the sealing means 24 such that it expands radially inwardly into engagement with the second flowline member F2 as discussed more fully hereinbelow.

Preferably, a suitable seal 28 is mounted with the first housing member H1 in detent 10k formed in outer annular surface 10e for insuring a fluid-tight relation between outer annular surface 10e and internal bore 16a.

A thrust member 30 is adapted to be disposed adjacent thrust ring detent 16d of housing 16 with surface 30a of the thrust member 30 conforming substantially to that of the thrust ring detent 16d. The thrust member 30 is further formed having a radial surface 30b that is adapted to be in alignment with end surface 16e of housing 16 when positioned in thrust ring detent 16d. Annular surface 30c is formed adjacent radial surface 30b with radial surface 30d formed adjacent annular surface 30c. The thrust member 30 is further formed having a bore 30e therethrough that is preferably slightly larger than the outside diameter 14 of the second flowline member F2. A sealing member 32, of a preferably elastomeric material, is adapted to be disposed adjacent to radial surface 30d of thrust member 30 as discussed more fully hereinbelow.

The apparatus A of the present invention further includes a first flange 34 and a second flange 36, with the first flange 34 mounted for movement about the first housing member H1 and a second flange 36 adapted to be mounted for movement adjacent the outer end of the second housing member H2. Preferably, the first flange 34 is formed having an annular surface 34a, radial surfaces 34b, 34c, and outer annular surface 34d. A plurality of openings 34e are preferably formed about the circumference of the first flange 34 with the openings 34e being substantially parallel with the longitudinal axis of the apparatus A of the present invention. Preferably, the first flange 34 is mounted such that the inner annular surface 34a is in engagement with annular flange surface 10g of housing 10 and radial surface 34c engages radial flange surface 10f of the housing 10 of the first housing member H1. In such configuration, the first flange 34 may rotate about the first housing member H1. Surface 10h enhances the ease of mounting the first flange 34 with the first housing member H1.

The second flange 36 is mounted for movement adjacent the outer end of the second housing member H2 and is formed having a first annular surface 36a, a first radial surface 36b adjacent the first annular surface 36a, a second annular surface 36c adjacent the first radial surface 36b, a second radial surface 36d adjacent the second annular surface 36c, and a third annular surface 36e adjacent the second radial surface 36d. The first annular surface 36a has a diameter slightly larger than the outside diameter 14 of the second flowline member F2 and the third annular surface 36e has a diameter substantially the same as the outside diameter of the second housing member H2 as shown by the outer annular surface 16f. End surfaces 36f, 36g are formed with the second flange 36. A plurality of openings 36h are formed about the circumference of the second flange 36 with the openings 36h being substantially parallel to the axis of the apparatus A of the present invention and adapted to be in alignment with the openings 34e of the first flange 34. The sealing member 32 is adapted to be disposed between the first radial surface 36d and the radial surface 30d of the thrust member 30 for engaging the second flowline member F2 upon axial movement between the second flange 36 and thrust member 30, forcing the sealing member 32 radially inwardly into engagement with the outer surface 14 of the flowline member F2. Preferably, a seal 38 such as O-ring 38a is adapted to be disposed within a suitable detent 16h formed in housing 16 to sealably engage third annular surface 36c of second flange 36.

Figure 3:
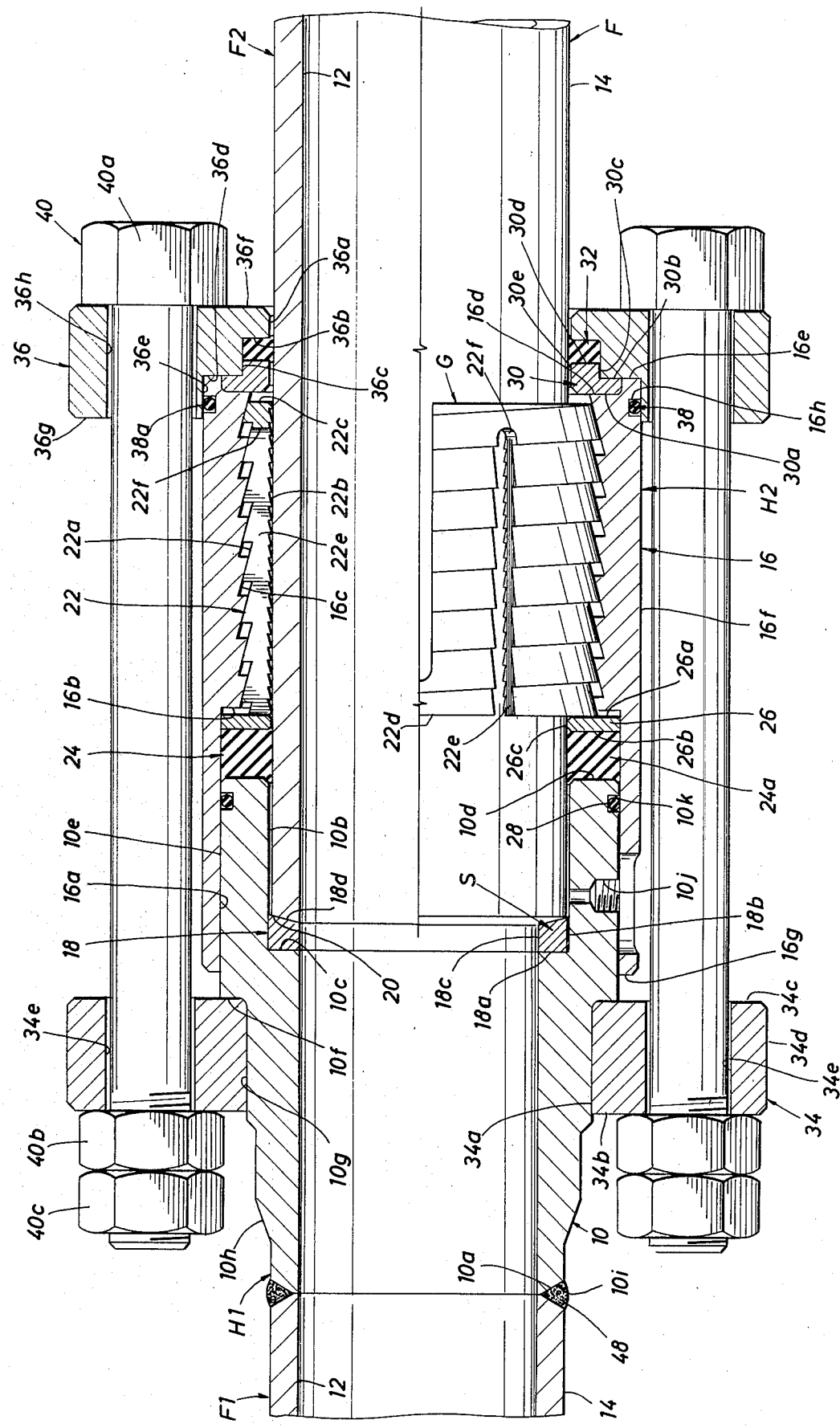

The apparatus A of the present invention further includes moving means designated generally as 40 for axially moving the first flange 34 toward the second flange 36. The moving means 40 is mounted with the first and second flanges 34, 36, respectively. The moving means 40 may be any suitable mechanism for drawing the first flange 34 towards the second flange 36. As shown in FIG. 3, the moving means 40 includes a plurality of threaded bolts 40a adapted to receive suitably formed nuts 40b and lock nuts 40c for drawing the flanges 34, 36 together. The apparatus A of the present invention is not intended to be limited by the use of threaded bolts 40a and is only an example of a means for axially moving the flanges 34, 36 theretogether. The threaded bolts 40a are adapted to be inserted in openings 34e, 36h upon proper alignment for drawing the flanges 34, 36 together in response to tightening action of nut 40b in engagement with the threaded shaft of the threaded bolts 40a.

As is shown in FIG. 1, it is typical for a platform such as platform 42 to have at least one, if not a plurality of flowline members F extending from the platform below the surface 44 of the water downwardly and along the platform supports 42a to adjacent the floor 46 of the body of water, be it a lake, ocean, or any other type of reservoir. The apparatus A of the present invention is adapted to connect first and second flowline members F1, F2 for fluid flow therethrough and as shown in FIG. 1 may be used either at a substantially horizontal or a preferable vertical position for the reasons set forth more fully hereinbelow.

Figure 2:
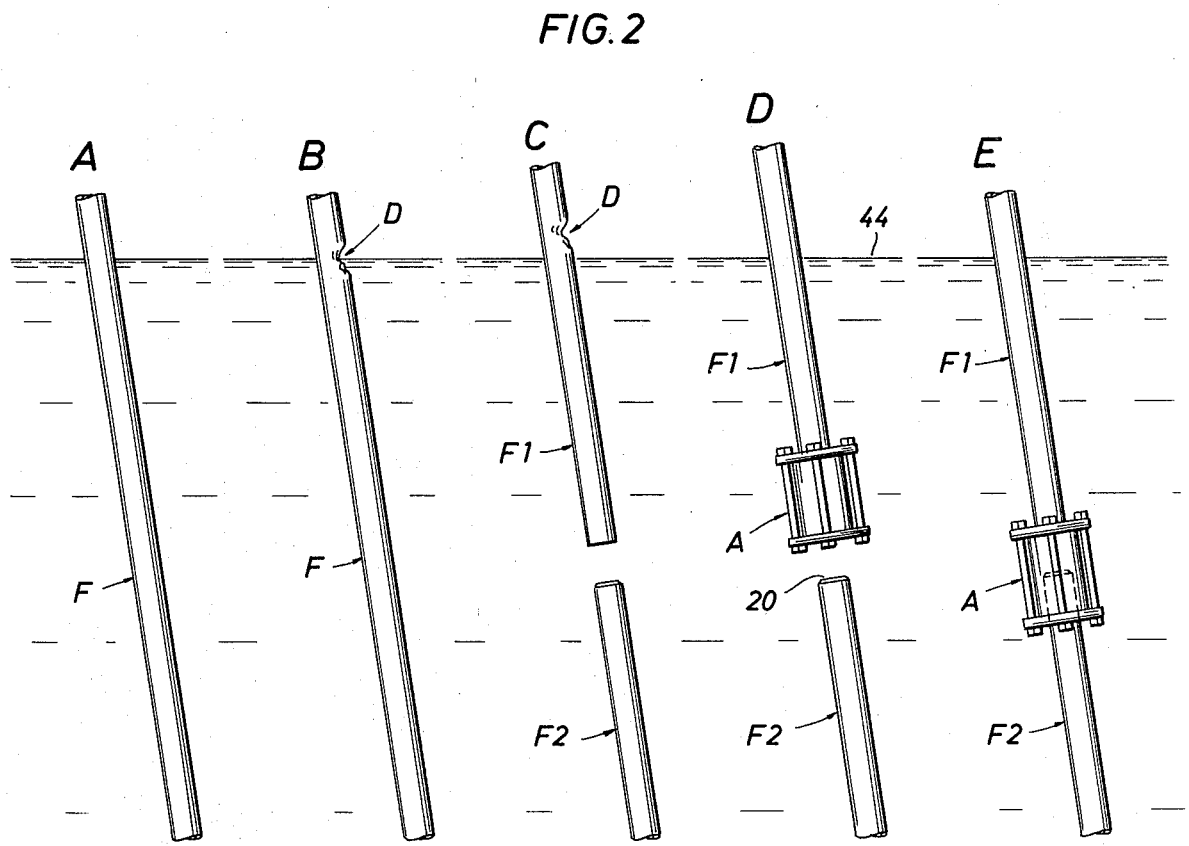
FIG. 2A–2E schematically illustrate the method for using the apparatus of the present invention for repairing a flowline; and, FIG. 3 is a sectional, elevational view of the apparatus of the preferred embodiment of the present invention.

As shown in FIG. 2, the apparatus A of the present invention may be used for repairing a damaged portion D of the damaged flowline F. By way of example, as shown in FIG. 2A, a flowline F typically is exposed to an aqueous environment that may, because of corrosive effects cause damage to the flowline or because of objects (i.e. ships, debris) floating on the surface 44 of the water the flowline may incur damage as shown in FIG. 2B adjacent the damaged area D. In the event of damage to the flowline F, the damaged area D must be removed. In order to remove the damaged area D, the flowline F must be cut to remove the damaged area D, leaving intact the undamaged portion of the flowline F. As shown in FIG. 2C, the first flowline member F1 has the damaged area D therewith and accordingly after cutting of the flowline member F, the first flowline member F1 must be removed leaving the second flowline member F2 which is undamaged, intact.

When cutting the damaged flowline member F1 from the undamaged portion F2, such can be accomplished with a conventional pipe cutter (not shown) which may be actuated in any suitable manner. During the cutting thereof, a surface such as butt end surface 20 may be machined at the end of the undamaged portion of the flowline F2 with such surface being compatible with similarly formed surface 18d of the seal ring 18. It will be appreciated that any suitably formed end surface may be formed, for example, a bevel surface as is shown. A beveled surface is presently capable of being machined with existing state of the art cutting devices used for severing the flowline members in an aqueous environment.

A new section of pipe is thereafter affixed with the apparatus A of the present invention by weldments 48 (FIG. 3) or any other suitable fashion affixed to a new portion of the first flowline member F1 which in effect secures the first housing member H1 of the apparatus A to the replacement portion of the flowline F1. The apparatus A having been affixed to the replacement first flowline member F1 is loosely assembled with all component parts thereof being in a released, non-sealing, non-gripping position, with the moving means 40 loosely holding all component parts theretogether. As shown in FIG. 2D, the first flowline member F1 with the apparatus A is thereafter lowered into the aqueous environment and made ready to be positioned over the undamaged, original second flowline member F2. Thus, the connector apparatus A having the first housing member H1 and second housing member H2 therewith is positioned over the undamaged portion of the flowline member F2 such that the butt end surface 20 of the second flowline member F2 engages the surface 18d of the seal ring 18 in an abutting relationship. Thereafter, the first and second housing members H1, H2 are moved axially toward each other to effectuate an abutting, sealable relation between the butt end surface 20 of the undamaged portion of the second flowline member F2 and the seal ring 18 and to grip the undamaged portion of the second flowline member F2 with gripping means G with the second housing member H2. More specifically, as the second flowline member F2 is inserted within the apparatus A of the present invention, the second flowline member F2 having an outside diameter 14 less than the first annular surface 36a of the second flange, bore 30e, bore 26c of thrust ring 26, and second bore 10b of housing 10, permits the second flowline member F2 to extend therethrough the second housing member H2 into the first housing member H1 such that the butt end surface 20 of the second flowline member F2 abuttingly engages the surface 18d of the seal ring 18. When inserting the flowline member F2 into the apparatus A in a non-actuated, non-sealing, non-gripping position, the end surface 16e of housing 16 and radial surface 30b of thrust member 30 do not engage the second radial surface 36d of second flange 36 as shown in FIG. 3. Further, the collet camming surface 22a of collet member 22 is not displaced from the housing camming surface 16c of housing 16 as shown in FIG. 3, but correspond substantially identically with one another with all radial surfaces thereof engaging one another. Furthermore, the surface 26a of thrust ring 26 is displaced from radial lip 16d of the housing 16 a greater distance than is shown in FIG. 3 with the sealing means 24 and sealing member 32 being in relaxed, non-compressed positions not in engagement with the outer annular surface 14 of the second flowline member F2.

Thereafter, the first and second housing members H1, H2 are moved axially toward each other to effectuate an abutting sealable relation between the butt end surface 20 of the second flowline member F2 and the surface 18d of the seal ring 18 and to grip the second flowline member F2 with gripping means G with the second housing member H2. Upon tightening of the moving means 40, the first flange 34 and second flange 36 are moved axially towards one another. It is preferred that alternate tightening of the multiple threaded bolts 40a in an alternating pattern be utilized to insure aligned axial movement of the flanges 34, 36 towards one another. As the flanges 34, 36 are moved toward one another, the first housing member H1 and second housing member H2 move together with a sliding relation between outer annular surface 10e and internal bore 16a of housings 10, 16, respectively. As the housing members H1, H2 move toward one another, a fluid-tight mechanical seal is effectuated between the butt end surface 20 and surface 18d of the seal ring 18. Furthermore, the second flange 36 engages the second housing member H2 and thrust member 30 therewith, compressing of the sealing member 32 to result in a sealable relation therebetween the sealing member 32 and the outer annular surface 14 of the second flowline member F2. As the second housing member H2 moves with respect to the first housing member H1, the housing camming surface 16c acts against the collet camming surface 22a, with relative movement therebetween forcing the collet member 22 into gripping engagement with the second flowline member F2 by means of the gripping surface 22b grippingly engaging the second flowline member F2. Further, movement of the collet member 22 results in movement of the thrust ring 26 towards the first housing member H1 resulting in compression of the sealing means 24 therebetween the thrust ring 26 and end surface 10d of housing 10 with the sealing means 24 being in sealable engagement with the outer annular surface 14 of the second flowline member F2. As a consequence, the second flowline member F2 is effectively made a part of the first flowline member F1 by means of the apparatus A of the present invention providing an appropriate sealing and gripping action.

It will be appreciated that the collet member 22 acts as a tension collet only, with there being no need for a compression collet inasmuch as the second flowline member F2 is in an abutting, sealable relation with the seal ring 18. Thus the seal ring 18 acts as a compression collet as well as a sealing member. Further, the weight of the apparatus A and first flowline member F1 tend to force the butt end surface 20 into the seal ring 18, when the flowline F is vertically oriented. Furthermore, the clamping force of the collet member 22 of the gripping means G about the undamaged portion of the second flowline member F2 helps to round out the pipe to insure a proper abutting relation between the butt end surface 20 and the seal ring 18.

After the apparatus A of the present invention is properly positioned and affixed with the second flowline member, the same may be tested by means of opening 10j. Upon pressurizing the flowline F, if a fluid-tight relation has not been achieved, leakage will occur and be detected through opening 10j in the housing 10. If leakage should occur, then the moving means 40 need merely be unloosened, the housing members H1, H2 separated, the apparatus A repositioned, and the process of retightening the apparatus A of the present invention reaccomplished as set forth hereinabove until a proper suitable relation is manifest between the second flowline member F2 and the seal ring 18 as well as between the second flowline member F2, sealing means 24, and seal 28. Alternatively, if the sealing means 24 is replaced with a suitable spring (not shown), the integrity of the fluid seal may be checked between the seal ring 18, seal 28 and sealing member 32.

Thus, the apparatus of the present invention and method of repairing a flowline using same provides a new and improved apparatus and method for positively connecting two flowline members together. Furthermore, the apparatus A of the present invention requires no special preparation to the second flowline member F other than the need to utilize a pipecutter (not shown) to cut an appropriately shaped butt end surface 20 to engage similarly formed surface 18d on the seal ring 18 without requiring any special polishing or machining of the outside diameter or any other special procedures to the second flowline member F2 before utilizing the apparatus A of the present invention.

The foregoing disclosure and description of the invention are illustrative and explanatory thereof, and various changes in size, shape and material as well as in details of the illustrated construction may be made without departing from the spirit of this invention.

I claim:

1. An apparatus for connecting first and second flowline members for fluid flow therethrough, comprising:
    a first housing member adapted to be mounted with the first flowline member, said first housing member having a first bore and a second bore formed therein, said first bore being of an inside diameter substantially the same as the inside diameter of the second flowline member, said second bore being of an inside diameter substantially the same as the outside diameter of the second flowline member, said first housing member having a radial lip formed adjacent said first and second bores;
    a seal ring for sealably engaging the butt end surface of the second flowline member for effecting a fluid-tight relation therebetween, said seal ring mounted in said first housing member adjacent said radial lip;
    a second housing member mounted for axial movement with respect to said first housing member;
    gripping means with said second housing member for moving radially inwardly into gripping engagement with the second flowline member upon axial movement of said second housing member relative to said first housing member;
    a first flange mounted for movement about said first housing member;
    a second flange mounted for movement adjacent an outer end of said second housing member;
    moving means for axially moving said first flange towards said second flange, said moving means mounted with said first and second flanges; and, said second flange is formed having a first annular surface, a first radial surface adjacent said first annular surface, a second annular surface adjacent said first radial surface, a second radial surface adjacent said second annular surface and a third annular surface adjacent said second radial surface, said first annular surface having a diameter slightly larger than the outside diameter of the second flowline member and said third annular surface having a diameter substantially the same as the outside diameter of said second housing member.

2. The apparatus of claim 1, wherein:
said first flange is rotatable about said first housing member.

3. The apparatus of claim 1, wherein:
said second flange is rotatable adjacent said outer end of said second housing member.

4. The apparatus of claim 1, further including:
a fluid seal member disposed between said second housing member and said third annular surface of said second flange to prevent fluid leakage therebetween.

5. The apparatus of claim 1, further including:
a sealing member mounted with said second annular surface between said first radial surface of said second flange and said second housing member and having a central bore of substantially the same inside diameter as said first annular surface; and,
a thrust member having an inner annular surface of substantially the same diameter as said first annular surface of said second flange, said thrust member disposed between said sealing member and said first housing member for compressing said sealing member into engagement with the second flowline member in response to axial movement between said first and second housing members.

6. The apparatus of claim 5, wherein:
said thrust member is formed having an outer annular surface for engaging said second annular surface of said second flange and an outer radial surface for engaging said second radial surface of said second flange.

7. The apparatus of claim 5, wherein:
said thrust member is formed having an inner radial surface for engaging said second housing member.

* * * * *